A. CAMPBELL.
Hay Rake and Loader.
No. 69,764.
Patented Oct. 15, 1867.
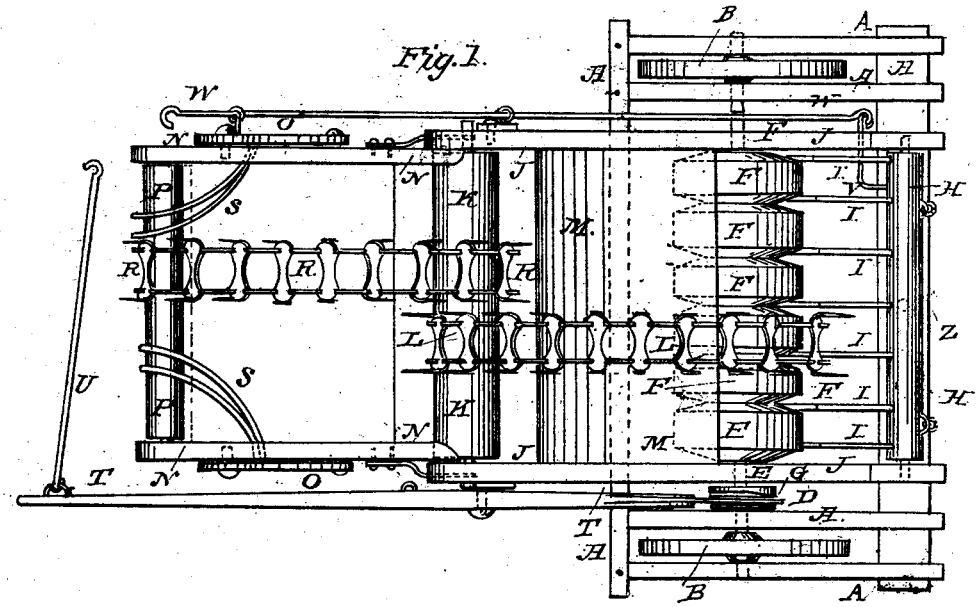
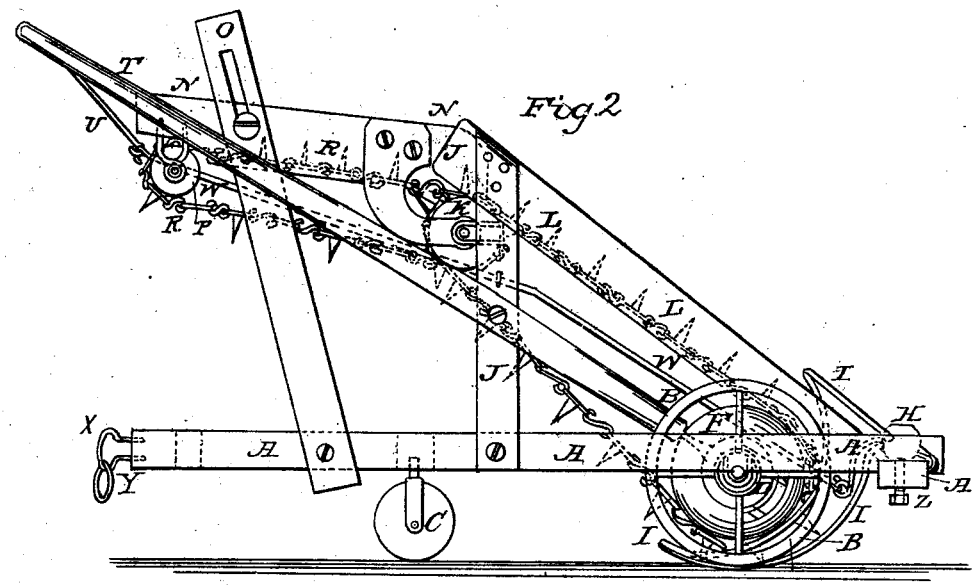
Witnesses
Inventor
A. Campbell

United States Patent Office.

ARCHIBALD CAMPBELL, OF PEORIA, ILLINOIS.

Letters Patent No. 69,764, dated October 15, 1867.

IMPROVEMENT IN HAY-RAKERS AND LOADERS.

The Schedule referred to in these Letters Patent and making part of the same.

TO ALL WHOM IT MAY CONCERN:

Be it known that I, ARCHIBALD CAMPBELL, of Peoria, in the county of Peoria, and State of Illinois, have invented a new and improved Hay-Raker and Loader; and I do hereby declare that the following is a full, clear, and exact description thereof, which will enable those skilled in the art to make and use the same, reference being had to the accompanying drawings, forming part of this specification, in which—

Figure 1 is a top or plan view of my improved machine.
Figure 2 is a side view of the same.
Similar letters of reference indicate corresponding parts.

My invention has for its object to furnish an improved machine for attachment to hay-wagons, by means of which the hay may be raked and elevated upon the wagon rapidly, conveniently, and without requiring extra help when the machine is used; and it consists in the construction, combination, and arrangement of the various parts of the machine, as hereinafter more fully described.

A is the horizontal frame of the machine, the rear part of which is supported upon the drive-wheels B, and the front part upon the caster-wheel C. The wheels B are attached to independent journals, which revolve in bearings in the frame A, and which have clutches D attached to their inner ends. E is the shaft, to which the lower carrier-pulleys F are attached, and which revolves in bearings in the frame A. The shaft E has clutches G placed upon its ends, upon which the clutches D take hold, and carry the shaft E with them when the machine is being drawn forward. The drawings show the clutches upon only one side of the machine, but they should be attached to both sides. The pulleys F are so attached to the shaft E as to be carried with it in its revolution. H is the rake-shaft, which rests upon the rear cross-bar of the frame A, to which it is hinged, as shown in fig. 1. To the forward side of the shaft H are attached the rake-teeth I, which pass down beneath the pulleys F, with a curve approximating to the curve of the said pulleys. The lower ends of the teeth I are slightly turned up, so that they may not catch in the ground; and their upper ends are curved upward, so as to pass above the pulleys, and guide the hay until it is well upon the carriers. Z is a set-screw, passing through the middle part of the rear cross-bar of the frame A, with its forward end passing against the lower side of the rake-shaft H, so that, by operating the said set-screw, the said shaft may be so adjusted that the rake-teeth may run close to or farther from the ground, as may be desired. J is the lower carrier-frame, which is placed in an inclined position, and is supported by and secured to the horizontal frame A. K is a roller, pivoted to the upper part of the frame J, around which and around the pulleys F pass the endless chains L, having prongs projecting upward, which receive the hay from the teeth I, and carry it up the stationary apron M, and deliver it to the upper carriers. The number of pulleys F upon the shaft E should be odd, and the endless chains L should pass around every other one of said pulleys, beginning with the outer ones, so that they may remove the hay from all the teeth I. The endless chains or carriers L are kept in their proper relative positions upon the pulleys F and roller K by guide-teeth attached to said pulleys and roller. N is an adjustable carrier-frame, the lower end of which is pivoted to the carrier-frame J, or to the journals of the roller K; and its upper end has guide-pins attached to it, which work up and down in slots in the uprights or standards O, so that the upper end of the machine may be adjusted according to the height of the load upon which the hay is to be delivered. P is a roller, pivoted to the upper part of the frame N, around which and around the roller K pass the endless chains R, having upwardly-projecting prongs formed upon or attached to them. The chains R pass around the roller K, between the chains L, so that there will be one less carrier in the upper series than there is in the lower series. To the inner side of the upper part of the upper frame N are attached guides S, inclining inward and upward, so as to guide and deliver the hay from the middle part of the upper end of said frame. The guides S make it necessary that the endless chains R, that pass beneath them, should be made without prongs. T is a lever, pivoted to the uprights of the lower carrier-frame J. The lower end of the lever T is forked, and rides upon a groove in the sliding-clutch G upon the end of the shaft E; and its upper end extends up into such a position as to be easily reached and operated by the person upon the load to throw the machine into or out of gear. A lever, T, should be placed upon each side of the machine, and their rear ends connected by the long hook U, pivoted to the upper end of the one lever, and hooking into a staple or eye attached to the other lever, so that they may both be operated at the same time. V is a bent lever or arm, one end of which is attached tothe rake-shaft H; and to its other end is attached the lower end of the rod W, which extends up along the frame of the machine into such a position that its upper end may be conveniently reached by the person upon the load to raise the rake-teeth to enable them to pass over stumps, stones, or other obstructions. X are long staples attached to the forward end of the frame A, in which work rings Y, through which are passed the straps by means of which the machine is connected to the axle of the wagon. By this means the machine is enabled to adjust itself to the inequalities of ground without bearing upon the wagon to which it is attached.

I claim as new, and desire to secure by Letters Patent—

1. The rake-head H, when hinged to the rear cross-bar of the frame A, and provided with the teeth I, bent in such a manner that the upper part of their front portions shall extend above the rollers F and return to the head H, forming an acute angle, said teeth and rake-head adjusted by means of the set-screw Z in the under part of the cross-bar, as herein described for the purpose specified.

2. The arrangement of the carrier-frame J, constructed as described, roller K upon its vertical part, carrier L, pulleys F, frame A, and adjustable rake and teeth H I, as herein described for the purpose specified.

3. The arrangement of the adjustable pivoted frame N, roller P, carriers L R, uprights O, roller K, and frame J, as herein described for the purpose specified.

4. The combination of the guides S with the upper carrier-frame N, substantially as herein shown and described and for the purpose set forth.

5. The slotted uprights O, in combination with the pivoted carrier N and frame A for adjusting said carrier to the varying height of the loaded hay, as herein shown and described.

6. The combination of the bent lever or arm V and rod W with the rake-shaft H and frame of the machine, substantially as herein shown and described and for the purpose set forth.

7. The arrangement of the levers J, clutches G D, shaft E, rods U, rollers F, and shafts of wheels B, as herein described for the purpose specified.

ARCHIBALD CAMPBELL.

Witnesses:
    JAMES C. MCKENZIE,
    W. G. RANDALL.